(12) United States Patent
Kieser et al.

(10) Patent No.: US 6,441,059 B1
(45) Date of Patent: Aug. 27, 2002

(54) AGRICULTURAL METHOD AND MATERIALS FOR SCREENING SOLAR RADIATION

(75) Inventors: Manfred Kieser, Darmstadt; Gerhard Edler, Trebur, both of (DE); Tony Leon Filip Daponte, Antwerpen; Patrick Corneel Mathilde Verschaeren, Brecht, both of (BE)

(73) Assignees: Merck Patent Gesellschaft MIT Beschrankter Haftung, Darmstadt (DE); Hyplast N.V., Hoogstraten (BE)

( * ) Notice: Subject to any disclaimer, the term of this patent is extended or adjusted under 35 U.S.C. 154(b) by 0 days.

(21) Appl. No.: 08/397,124

(22) PCT Filed: Aug. 31, 1993

(86) PCT No.: PCT/EP93/02380

§ 371 (c)(1),
(2), (4) Date: Jun. 20, 1995

(87) PCT Pub. No.: WO94/05727

PCT Pub. Date: Mar. 17, 1994

(30) Foreign Application Priority Data

Sep. 9, 1992 (NL) .............................................. 9201568
Sep. 10, 1992 (DE) .......................................... 42 30 023

(51) Int. Cl.[7] .......................... A01G 13/00; A01G 7/00; C08K 3/00
(52) U.S. Cl. ....................... 523/135; 523/205; 428/323; 428/324; 428/325; 428/331; 428/913; 252/582; 47/9; 47/17; 47/29.1; 47/DIG. 6
(58) Field of Search ................................. 428/323, 324, 428/325, 328, 331, 913, 919, 920; 523/135, 205, 217; 252/62, 70, 582, 586; 47/26, 58, DIG. 8, 58.1, DIG. 6, 9, 17, 20.1, 29.1

(56) References Cited

U.S. PATENT DOCUMENTS

| | | | | |
|---|---|---|---|---|
| 4,090,773 A | | 5/1978 | Bauer et al. ................. 359/359 |
| 4,289,677 A | * | 9/1981 | Supcoe et al. | |
| 4,306,542 A | * | 12/1981 | Reinert ........................ 126/429 |
| 4,455,246 A | * | 6/1984 | Schmidt et al. ............... 252/62 |
| 4,895,904 A | * | 1/1990 | Allingham ................... 523/135 |
| 4,910,235 A | | 3/1990 | Satake et al. ................ 523/171 |
| 4,911,985 A | | 3/1990 | Jenkins et al. .............. 428/446 |
| 5,008,143 A | * | 4/1991 | Armanini .................... 428/207 |
| 5,022,181 A | * | 6/1991 | Longstaff ........................ 47/31 |
| 5,138,792 A | | 8/1992 | Allingham ....................... 47/9 |
| 5,310,598 A | * | 5/1994 | Yoshinaka et al. .......... 428/328 |

FOREIGN PATENT DOCUMENTS

| | | |
|---|---|---|
| DE | 1694349 | 11/1970 |
| DE | 29 40 230 A1 | 4/1981 |
| DE | 41 34 839 A1 | 4/1992 |
| EP | 0 193 902 A2 | 9/1986 |
| EP | 0 340 313 A1 | 11/1989 |
| EP | 0 428 937 A1 | 5/1991 |
| EP | 0 433 872 A2 | 6/1991 |
| JP | 62-050344 | 3/1987 |

OTHER PUBLICATIONS

Grant & Hackh's Chemical Dictionary, 5th ed., 1987, McGraw–Hill, Inc., p. 146.*

PCT International Search Report Application No. PCT/EP 93/02380 mailed Apr. 27, 1994.

Novelty Search Report, Dutch Priority Application 9201568 mailed Apr. 21, 1993.

* cited by examiner

*Primary Examiner*—Marie Yamnitzky
(74) *Attorney, Agent, or Firm*—Pitney, Hardin, Kipp & Szuch LLP

(57) ABSTRACT

Composite material for the screening of radiation, comprising a polymer, an additive and the customary stabilizers and processing aids necessary for the particular polymer. The additive is preferably an interference pigment.

9 Claims, No Drawings

AGRICULTURAL METHOD AND MATERIALS FOR SCREENING SOLAR RADIATION

BACKGROUND OF THE INVENTION

1. Field of the Invention

The present invention relates to a polymeric substance and an additive for the screening of solar radiation with the aim of influencing plant growth and the morphogenesis.

2. Brief Description of the Related Art

It is necessary for a controllable growth of plants to set up special light conditions to affect plant growth and morphogenesis. Special light conditions for plant growth, for example, within a greenhouse or under a mulch film include some which are of particular interest. The temperature within the enclosed area and the light intensity and the spectral distribution of the incoming light are important factors for the plant growth.

Plants, grown in a greenhouse build a resistance to the variations in temperature. From this it follows that the plants stay back in growth. Thus, for the photosynthesis in greenhouses the photosynthetically active radiation (PAR) is only desired while other parts of the solar light should be screened because they have mainly a negative influence on the microclimate. Therefore the following objectives have to be achieved. Firstly, the intensive irradiation by sunlight in particular by NIR radiation needs to be screened, in order to avoid too high temperatures within the enclosed area. Secondly, the incoming light beams are to be scattered in order to prevent burnings on plants. Thirdly, heat within the area is to be stored at night.

However, in case of mulch films the opposite effect is desired. The PAR should be screened and all other parts of the solar light should be transmitted. Mulch films are used in agriculture to improve the growing conditions of the useful plants and to minimize the use of chemical herbicides.

For certain crop growers want to intervene in the plant morphogenesis. Morphogenesis is the influence from environmental factors on the shape and appearance of the plant. One of them is the light quality. It means that the spectral energy distribution has an effect on the growth of plants.

Raviv and Allingham describe in "Plastic Culture", No. 59, September 1989, pp. 3 to 12, that diffuse light is favourable for a steady growth of plants. Furthermore, it turned out that diffuse light has the advantage that the plants are not going to be damaged. Hancock describes in "Plastic Culture", No. 79, 1988, pp. 4 to 14, that special additives in LDPE have a favourable effect on the microclimate in greenhouses because of the generation of diffuse light and the creation of a favourably thermic effect in the greenhouses. Suitable additives are aluminosilicate in the form of kaolin, calcium carbonate, talc and kaolin clay.

Greenhouses made of glass already fulfil some of the above-mentioned conditions by virtue of the inherent physical properties of inorganic glasses. Furthermore, constructive measures, for example knurled glass or shadow cloth are known.

If the enclosing material is plastic, such as, for example, polyethylene, polyethylene/vinyl acetate copolymers, polyvinyl chloride, polycarbonate or polyacrylate, it is much more difficult to meet these requirements. The high transparency of many plastics for IR radiation results in good heat transmission which, in the case of films, is additionally assisted by the low film thickness.

A polymethyl methacrylate glazing material for buildings and vehicles containing an interference pigment for the screening of NIR radiation of a wave length between 800 and 1500 nm is disclosed in DE 2,544,245.

The pigment used has a blue-red colour and the light transmitted through the glazing material has a yellow-green colour. When used in greenhouses, this glazing material has the disadvantage that portions of visible light which cannot be utilized by the plant are transmitted and, on the other hand, the red portion of visible light which can be utilized by the plant is screened off by said glazing material. Furthermore, the transmitted green portion has the additional disadvantage that it contributes to heating of the greenhouse by virtue of its conversion into long wave light.

EP-A 0,428,937 describes a grey-white coating composition for greenhouses consisting of a polymer substrate and reflecting particles suspended therein. These particles are aluminium platelets or mica platelets coated with titanium dioxide. The coating composition is used for temporary coatings in extreme weather conditions (summer). In winter, it can again be removed by washing it off with a water jet. More details regarding the pigment used are not given.

The coating composition has the disadvantage that not only the IR beams but also a substantial portion of the visible light which can be utilized by the plant are reflected by the metal particles. The green portion of the transmitted light cannot be utilized by the plant and contributes to heating of the greenhouse.

EP-A-03 98 243 describes polymeric mulch sheets and mulch films for use in agriculture which have a green absorption colour and contain a UV stabilizer. The green sheets and films absorb a large part of the solar radiation which promotes photosynthesis and plant development (PAR), and transmits enough solar radiation so as to heat the soil beneath such films and sheets. Such mulch films and sheets reduce weed growth but they have the disadvantage that the photosynthetically active radiation is absorbed and is lost for the useful plant.

L. M. Mortensen and E. Stromme describe in Scientia Horticulturae 33 (1987), 27–36 the effects of light quality on some greenhouse crops. Different light qualities were established in growth chambers placed outdoors by selective screening of the natural light spectrum in the chambers. The PAR level was the same at all light qualities. Blue light containing a high red/far-red ratio reduced the dry weight compared to natural (N), green, yellow and red light in chrysanthemum, tomato and lettuce. Plant height in chrysanthemum and tomato was strongly reduced by blue compared to N light, and strongly increased by green and yellow light.

SUMMARY OF THE INVENTION

The aim of the invention is.,to provide a composite material for the screening of intensive irradiation by sunlight, which material reflects, apart from the IR portion, also a green portion of visible light which cannot be utilized by the plant.

A further aim of the invention is to provide a composite material useful as mulch film or mulch sheet which do not absorb the photosynthetically active radiation.

Lastly, it is the aim of the invention to provide a composite material useful as covering material for the influencing of plant morphogenesis.

This object is achieved according to the invention by a composite material comprising a polymer and an additive and the customary stabilizers and processing aids necessary for the particular polymer.

DETAILED DESCRIPTION OF THE PREFERRED EMBODIMENTS OF THE INVENTION

The additive according to the invention is a platelet-shaped material or a platelet-shaped material coated with one or more metal oxides.

Usually the platelet-shaped material consists of layered silicate, synthetic mica, glass platelets, ceramic platelets and silicia platelets.

Preferably the layered silicate is mica, pyrophillite, sericite, talc or kaolin.

The platelet-shaped material coated with one or more metal oxides is preferably an interference pigment.

The preferably used interference pigments are platelet-like pigments consisting of platelet-like substrate, such as for example, mica, kaoline or talc, and one or more metal oxide films thereon.

The metal oxides which can be used are only those oxides which allow the preparation of interference pigments, for example, oxides of the metals tin, titanium, zirconium, chromium, cerium, iron or tungsten.

In order to be able to produce interference colours, a certain film thickness is necessary. This film thickness depends on the metal oxide used. If titanium dioxide is used, it is for example advantageous to apply a film in a thickness of 120 to 160 nm for obtaining a pigment having a green interference colour.

In the invention the substrate preferably has a diameter of from 1 to 200 Am and more preferably from 5 to 60 $\mu$m and a thickness of from 0.1 to 10 $\mu$m, preferably from, 0.5 to 1.5 $\mu$m.

The additive content of the composite material is 0.1 to 30% by weight, preferably 0.5 to 5% by weight, based on the polymer. The additive content depends on the film thickness of the composite material. The term "additive" includes also mixtures of additives.

For the composite materials according to the invention, it is possible to use as additive commercially available interference pigments, which are available under the trade name Iriodin$^R$ manufactured by E.MERCK, Darmstadt. They consist of mica, $TiO_2$ and $SnO_2$.

The polymer according to the invention may be an organic or inorganic polymer.

Said organic polymers used for the preparation of the composite materials are transparent materials like polyolefins, co- or terpolymers, for example low-density polyethylene (LDPE), vinylester copolymers like ethylene-vinylacetate copolymer (EVA), fluoropolymers, co- or terpolymers like polytetrafluoroethylene (PTFE) and polyvinylidene chloride (PVDC), polyvinyl chloride (PVC), polycarbonate (PC), polymethylacrylate (PMMA) or mixtures of transparent polymers. The term "polymer" may include mixtures of polymers.

As inorganic polymer glass may be used.

The composite materials additionally may contain the stabilizers and processing aids necessary for the particular polymer.

The composite material according to the invention can be used in the form of films, sheets, spinbonded and woven fabrics and profiles, preferably in plant cultivation and in plant growing (agriculture and gardening). The composite material according to the present invention can be used, for example, in the form of films or plates for greenhouses, as tunnel films and mulch films. Furthermore, it can be used in the form of film for covering of soils or as substrate film. It can be produced using the customary plastic processes, such as film blowing, film casting, coextrusion, cast film extrusion or lamination in the form of films, multilayer films or sheets.

For optimum effect of the interference pigment, it is necessary to align the pigment platelets in the composite material parallel to the surface and parallel to one another.

This must be taken into account, for example, in casting. In other processing procedures, this parallel alignment necessarily follows from the flow characteristic of the melt.

For the effectiveness of the pigment, it is immaterial whether the polymer is completely coloured or the pigment is present in one or more layers of a multilayer system. Such multilayer systems can be produced by coextrusion, coating, extrusion coating, laminating or printing.

The composite material according to the invention used as covering for greenhouses preferably contains a green interference pigment. That means that the longwave infrared radiation is absorbed, the near infrared radiation is reflected together with the green portion of the incoming visible light and only the red and blue portions of visible light which can be utilized by the plant are transmitted and scattered.

On the other hand the composite material absorbs the infrared radiation which is reflected or emitted by the ground or the contents of the enclosed areas and prevents a too strong cooling of the enclosed areas at night. Consequently, the incoming light is used optimally for the climate under the composite material.

In case the composite material according to the invention is used as mulch film or mulch sheet it is desired to screen the photosynthetically active radiation in order to prevent the growth of weeds. Therefore, according to the invention an additive, preferably an interference pigment is used, which reflects the PAR. The reflection of the PAR by the mulch film or sheet has the advantage that the useful plant which grows above the mulch film can use the reflected PAR for its growth. In case of a black film or a green film coloured with an absorption pigment the PAR is absorbed and is lost for the useful plant.

According to the invention a red-blue interference pigment, for example IRIODIN$^R$ 219 Rutile Lilac Pearl, is used. This mulch film or mulch sheet can be used alone or in combination with a second layer or a separate film containing known absorption pigments below. This could be done, for example, in a two or multilayer film in which the interference pigment is in the upper layer while the absorption pigment is in the lower layer.

As a result the mulch films or mulch sheets according to the invention improve the microclimate below the film (temperature and humidity of the soil) and in addition to known films improve the growth of the useful plants by reflecting the PAR.

When the composite material according to the invention is used for modifying the plant morphogenesis an additive, preferably an interference pigment is used which changes the spectral distribution of the sunlight.

For certain crops growers want to modify the plant morphogenesis. Morphogenesis is the influence from environmental factors on the shape and appearance of the plant.

It is well known in agriculture that growth, blooming and crops can be influenced by the spectral composition of light.

Plants contain pigments which can deduct of the incoming light, certain wave lengths and their intensity. The most important plant pigments for morphogenesis are the phytochrome and cryptochrome. Phytochrome absorbs mainly in the Red/Far Red region (680 nm/730 nm). Cryptochrome absorbs in the blue and UV-A region (315 to 500 nm).

Photoselective light in the Blue or in the Red/Far Red region activates the plant pigments positively or negatively and plays an important role in growth and flowering, for example.

These relations were found by agricultural experiments—in which different lamps, filters and coloured films were used. The use of filters and coloured films always has the disadvantage of a loss of energy which reduces the efficiency.

The present invention describes a novel method to influence the photogenesis by using interference pigments. Light passing through the composite material containing interference pigments can influence the physiological responses of plants. This is due to changes in the Red/Far Red ratio, Blue/Red ratio and Blue/Far Red ratio which control plant morphology. Reducing Red/Far Red ratio with a blue interference pigment like Iriodin$^R$ 225 Rutile Blue Pearl or Iriodin$^R$ 221 Rutile Fine Blue results in plants with longer internodia, fewer branches and longer but smaller leaves.

Bolting can be reduced by increasing the Blue/Red ratio (relatively richer in Blue than in Red) using a composite material which contains a yellow interference pigment like Iriodin$^R$ 205 Rutile Platinum Gold.

When a more compact plant growth (suppressed stem elongation) is required a high Red/Far Red ratio combined with a high Blue/Red ratio is obtained by a composite material containing a yellow-green interference pigment of second order. In these cases the use of hormonal growth regulators could be avoided.

Depending on the plants and the aim, a suitable interference colour can be chosen of the wide range of colours. The maximum reflection (minimum transmission) can be brought to every wave length by creating a layer thickness of the interference pigments. The selection has to be done according to the state of the knowledge. The use of interference pigments gives the possibility to select a certain spectrum without the loss of too much radiation energy.

As a consequence of the transparency and the absence of absorption in the interference pigments used, the incoming light is hardly diminished by scattering and absorption. Measurements have shown that only about 5% of the increasing light is absorbed. The low heat conductivity of the pigment used has a positive effect on the thermal resistance and the heat storing capacity of the composite materials according to the invention. The selective reflection results in a uniform climate within the greenhouse in almost any weather without screening off, to any great extent, the portions of visible light which can be utilized by the plant.

EXAMPLE 1

0.5% of dioctyl phthalate is added as adhesive to igh-density polyethylene granules (extrusion type suitable or film production, MFI4), followed by mixing in a tumbler ixer until the surface of the granules has been homogeneously wetted. After addition of 1% of Iriodin$^R$ 235 Rutile Green Pearl (a green TiO$_2$/mica interference pigment) mixing is continued for a short period, as a result of which the pigment platelets form a uniform strongly adhering film on the granules.

This colour compound thus prepared is formed into a film of 200 µm in thickness by means, of a film blowing extruder. Viewed by reflected light, the film shows a strong green interference colour, while when viewed by transmitted light a bluish red colour is visible.

EXAMPLE 2

The film production takes place analogously to Example 1. However, for colouring the pigment was predispersed in a high percentage colour master batch (for example 40% of pigment) prior to production. Furthermore, Iriodin$^R$ 9235 Rutile Green Pears WR is used instead of Iriodin$^R$ 235. The addition of 2.5% of the master batch also gives a film having a pigment content of 1%.

EXAMPLE 3

Five parts by weight of epoxidized soya bean oil, 3 parts by weight of an organotin stabilizer, 1 part by weight of lubricant and 0.5 part by weight of a benzotriazole UV absorber are added to 100 parts by weight of PVC suspension, and 0.2 part by weight of a green third order TiO$_2$/mica interference pigment is added in a high-speed mixer, and the mixture is cooled to below 50° C. by means of water cooling at low motor speed.

This pigmented dry blend is then formed into a double-walled sheet via a twin screw extruder using the apropriate profile tool. When viewed by reflected light, the sheets show a strong green interference colour and, when viewed by transmitted light a diffused, uniform, bluish red.

The recorded reflection and transmission spectra show that in the products obtained a high percentage of the NIR and the green light is reflected. The wave length distribution of the transmitted light is in a range favourable for plant growth. Absorption within visible light and within the NIR is below 5%.

EXAMPLE 4

10% of Iriodin$^R$ 231 Rutile Fine Green are thoroughly dispersed in a commercially available, transparent gravure printing ink suitable for printing PVC by means of a propeller stirrer, and that dispersion is printed on a transparent PVC film by means of the gravure printing process. To prevent the pigment platelets, whose diameter can be up to about 25 µm from being destroyed, the screen size selected for the pigment chosen is 70 lines/cm. At an etching depth of the colour cups of about 40 µm, a printed film of 30 µm in thickness which, after drying, forms a film of about 10 µm in thickness is obtained.

This gives a thin radiation-screening film which, for example, can be applied to glass surfaces by means of an adhesive film.

EXAMPLE 5

A LPDE film with a thickness of 50 µm is produced by film blowing of a mixture of 6 parts of master batch containing 30%. by weight Iriodin$^R$ 219 Rutile Lilac Pearl and 94 parts of LDPE.

The film looks green in transmitted light and lilac in reflection. The film is used as mulch film.

EXAMPLE 6

A LDPE film with a thickness of 50 µm is produced by film blowing of a mixture of 6 parts of a masterbatch containing 30% by weight of Iriodin$^R$ 205 Rutile Platinum Gold and 94 parts of LDPE.

The film looks blue in transmitted light and yellow in reflection. The film is used for covering of plants in order to influence the plant morphogenesis.

What is claimed is:

1. Solar radiation screening composite material consisting essentially of a transparent polymer selected from the group consisting of low density polyethylene, ethylenevinylacetate copolymer, polytetrafluoroethylene, polyvinylidenechloride, polyvinyl chloride, polycarbonate, polymethacrylate or mixtures thereof; and a green interference pigment, wherein no more than 5% of visible and near infrared light is absorbed.

2. The material of claim 1 wherein the pigment is in the form of platelets coated with a metal oxide.

3. The material of claim 2 wherein the platelets comprise a substrate selected from the group consisting of layered silicate, synthetic mica, glass, ceramidiand silica.

4. The material of claim 3 wherein the substrate selected is a layered silicate selected from the group consisting of mica, pyrophyllite, sericite, talc and Kaolin.

5. The material of claim 1 wherein the green interference pigment is present in an amount within the range of 0.1 to 30 percent by weight of the polymer.

6. The material of claim 1 in the form of a glazing.

7. A method of growing plants exposed to solar radiation, which comprises;

screening the plant from solar radiation with a screen which comprises:

a transparent polymer selected from the group consisting of low density polyethylene, ethylenevinylacetate copolymer, polytetrafluoroethylene, polyvinylidenechloride, polyvinyl chloride, polycarbonate, polymethacrylate or mixtures thereof; and a green interference pigment.

8. The method of claim 7 wherein the plant is chrysanthemum.

9. The method of claim 7 wherein the plant is tomato.

* * * * *